UNITED STATES PATENT OFFICE.

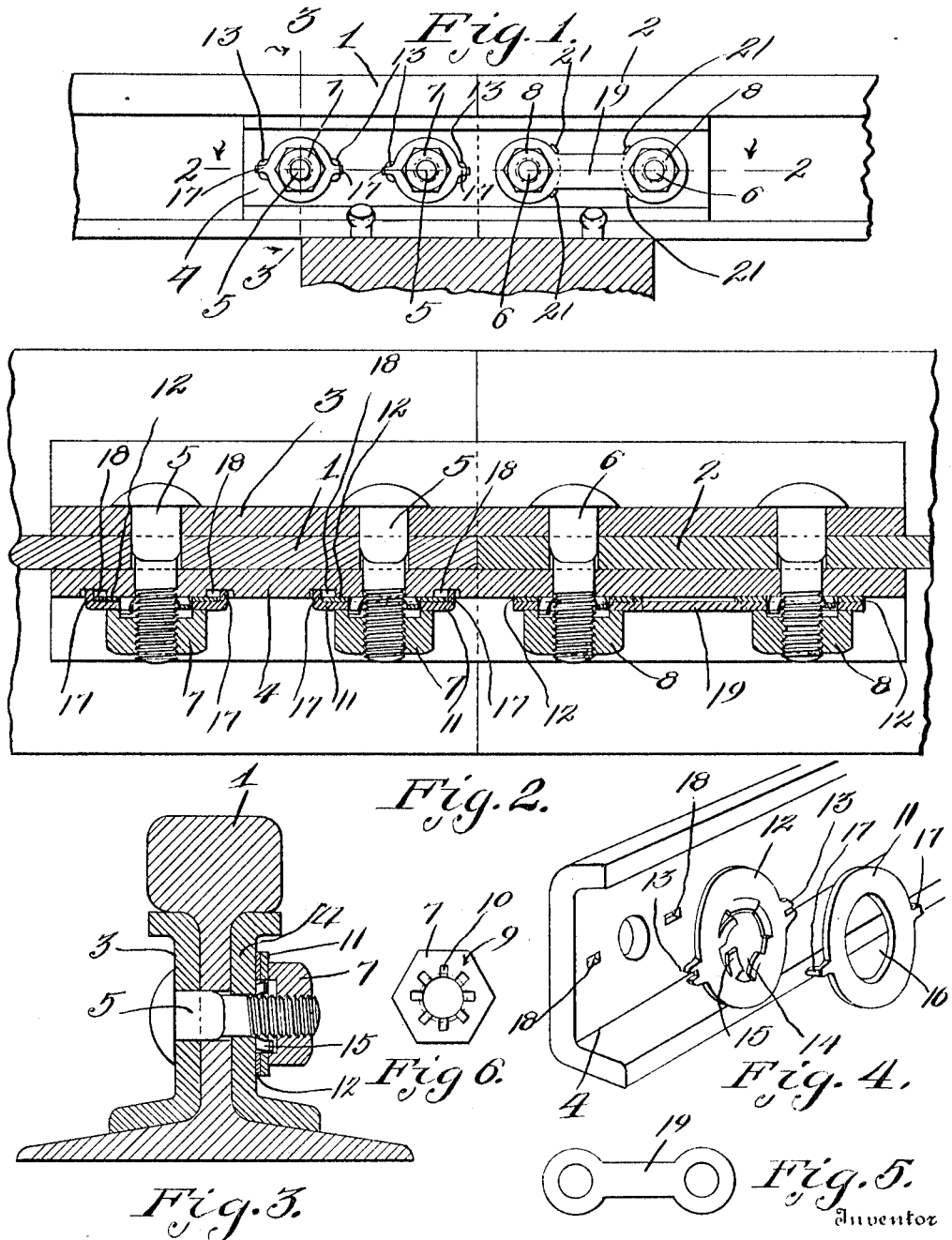

GUSTAF GUSTAFSON, OF BRUNSWICK, MAINE.

NUT-LOCK.

1,117,373. Specification of Letters Patent. Patented Nov. 17, 1914.

Application filed July 11, 1914. Serial No. 850,480.

*To all whom it may concern:*

Be it known that I, GUSTAF GUSTAFSON, a citizen of the United States, residing at Brunswick, in the county of Cumberland and State of Maine, have invented a new and useful Nut-Lock; and I do hereby declare the following to be a full, clear, and exact description of the invention, such as will enable others skilled in the art to which it appertains to make and use the same.

This invention relates to an improved nut lock, and the aim of the invention is to provide a simple and efficient cheap and practical construction of nut lock especially adapted for use in connection with fish plates of a rail joint, to one of the fish plates an auxiliary washer is clamped by means of a dominant washer, the auxiliary washer having circumferentially arranged spring teeth to engage the teeth of the nut to lock the same against said washer.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective showing a pair of adjoining rails connected by a pair of fish plates, and showing the improved nut lock construction applied. Fig. 2 is a longitudinal sectional view through the rails and the fish plates on line 2—2 of Fig. 1 showing two constructions of the nut lock. Fig. 3 is a sectional view on line 3—3 of Fig. 1. Fig. 4 is a detail view of one of the fish plates, and showing two of the washers in position ready to be placed adjacent said fish plate. Fig. 5 is a view showing two washers differently constructed so as to be held in place. Fig. 6 is a detail view of one of the nuts 7.

Referring more especially to the drawing 1 and 2 designate two adjoining rails, 3 and 4 the fish plates (which are of a shape to fit adjacent the opposite sides of the webs of the rails), there being bolts 5 and 6 extending through said rails and fish plates having suitable nuts 7 and 8, the faces 9 of which are provided with teeth 10 arranged circumferentially adjacent the peripheral corners of the bores of said nuts. Arranged between the face 9 of the nut 7 and the fish plates 4 are two washers 11 and 12, the washer 11 being in contact with the face 9 of the nut, the washer 12 is in contact with the fish plate 4. The washer 12 is provided with pairs of diametrically opposite lugs 13, the lugs of each pair are spaced apart. Adjacent the central opening 14 of the washer 12 are circumferentially arranged spring teeth or lugs 15 extending annularly, and are offset from the face of the washer sufficiently to extend beyond the washer 11 through its central opening 16, in order to engage the circumferentially arranged teeth of said nut, thereby locking the nut in position. The washer 11 is provided with diametrically opposite lugs 17, which are extended laterally and between the lug 13, in order to engage the depressions 18 of the fish plate 4, thereby not only preventing annular movement of the washer 12 but also preventing corresponding movement of the washer 11. In the drawings there are two nuts 7, which together with their attending parts are constructed alike. There are also two nuts 8, which are alike in structure and corresponding in structure to the nut 7. However, the washers 11 adjacent the nuts 8 are connected by a flat bar 19, while the washers 12 are provided with lugs 21 engaging upon opposite edges of said flat bar, thereby preventing the washers 12 from moving annularly. The washers 12, on the bolts having the nuts 8, are also constructed with said spring teeth extending through the central openings of the washers 11 to engage the teeth of said nuts 8, to lock them in position.

The invention having been set forth, what is claimed as new and useful is:—

In combination with a pair of fish plates adapted to engage opposite sides of a rail, a bolt extending through the fish plates and the rail, a nut having circumferentially arranged teeth on one face adjacent its bore and threaded upon the shank of the bolt, a pair of washers between the nut and one of the fish plates, one of said fish plates having diametrically opposite depressions, one of the washers having diametrically opposite lugs extending into said depressions, the other washer having pairs of lugs arranged diametrically opposite each other, the lugs of one pair engaging opposite sides of the lugs which extend through said depressions, to prevent the washers against rotation, one of the washers having spring teeth cut therefrom circumferentially adjacent the opening of the washer and extending laterally through the opening of the other washer and engaging the teeth of said nut.

In testimony whereof I have signed my name to this specification in the presence of two subscribing witnesses.

GUSTAF GUSTAFSON.

Witnesses:
WILLIAM L. HASKELL, M. D.,
M. A. PARLIN.

Copies of this patent may be obtained for five cents each, by addressing the "Commissioner of Patents, Washington, D. C."